May 8, 1962  J. P. WESSON  3,033,393
PROCESS CONTAINERS
Filed Sept. 30, 1959  2 Sheets-Sheet 1
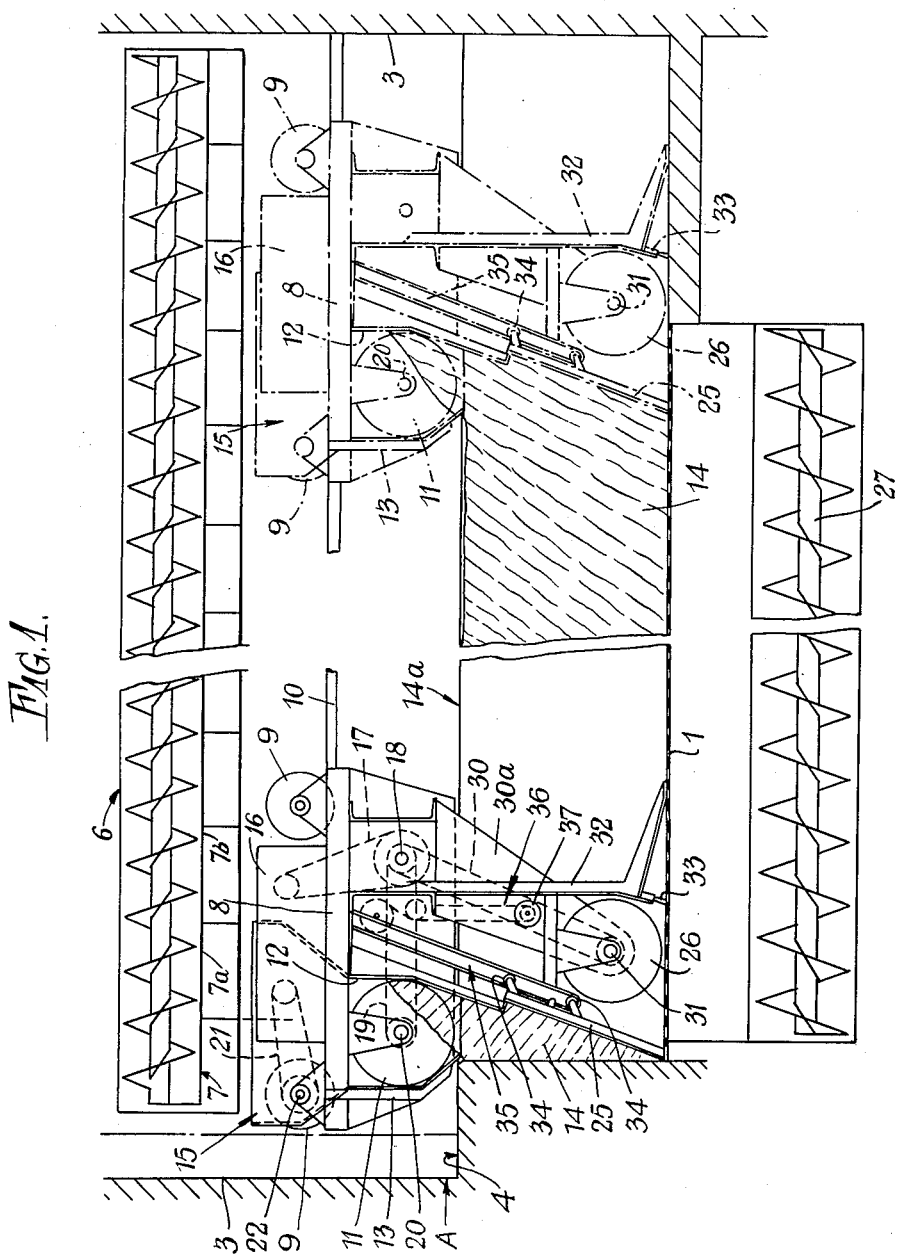

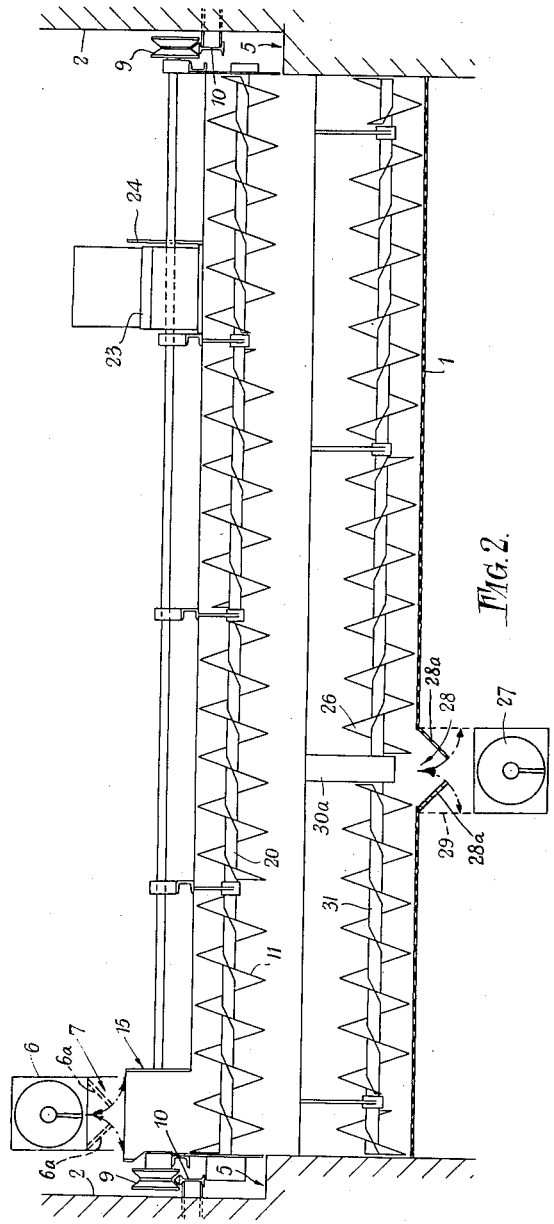

United States Patent Office 3,033,393
Patented May 8, 1962

3,033,393
PROCESS CONTAINERS
Joseph Percy Wesson, Bury St. Edmunds, England, assignor to Robert Boby Limited, Bury St. Edmunds, England, a British company
Filed Sept. 30, 1959, Ser. No. 843,570
Claims priority, application Great Britain Nov. 20, 1958
12 Claims. (Cl. 214—17)

This invention relates to process containers such as kilns, saladin boxes or the like of the kind commonly employed for treating malt, barley, grain or other similar granular materials.

Such process containers are normally loaded with the material to be treated by means of fixed or adjustable spouts fed by conveyors, and the material, on arrival at the floor of the container, has to be spread by hand to form a layer of constant thickness in order to permit even air flow through the load. In large deeply-loaded containers this involves a considerable amount of labor and even then difficulties can be experienced due to uneven air flow resulting from the trampling of the material by the operators, which trampling tends to create local increases in density. It is also quite common to unload such containers through openings in the floor from which spouts or the like lead to conveyors. Here again, however, a considerable amount of labor can be involved in shovelling or bringing the material to the various floor openings.

A main object of the present invention is materially to reduce the manual labor involved in the employment of process containers.

Accordingly, the invention provides a process container of the kind referred to having a mechanical charging apparatus including a division wall which spans the width of the container down to floor level and is movable along the container length from one end to provide a charging space behind the wall in the container having a capacity which can be progressively increased during charging to an extent dependent upon the quantity of material fed to the container, and further including spreading conveyor means arranged to move along the length of the container behind the said wall for the purpose of evenly layering material fed to the charging space.

According to a further aspect, the invention provides a process container of the kind referred to having combined mechanical charging and discharging apparatus including a movable carriage which is mounted to travel along the length of the interior of the container, above the intended content level, in one direction for charging and in the opposite direction for discharging purposes, and which supports upper transverse spreading conveyor means extending across the width of the container near the intended content level, similarly extending lower transverse collecting conveyor means near floor level and transverse retractable wall means arranged to divide off the collecting conveyor means from a variable charge receiving space in the container over which the spreading conveyor means operates during charging.

The spreading conveyor means will conveniently be arranged to receive a charge to be spread over the container floor from a loading conveyor which extends lengthwise inside the container above the aforesaid carriage, while the collecting conveyor means will be arranged to feed on to a discharging conveyor which runs parallel to the loading conveyor beneath an outlet opening extending lengthwise in the container floor.

In order that the invention may be clearly understood and readily carried into effect, an embodiment thereof will now be described in greater detail with reference to the accompanying drawings in which:

FIGURE 1 is a sectional side elevation through the relevant part of a process container and shows, in partially diagrammatic form, a combined mechanical charging and discharging apparatus of the invention in full lines at the commencement of a charging traverse and in chain dotted lines at the end of the traverse, and FIGURE 2 is a transverse partially diagrammatic sectional view through the process container of FIGURE 1, and shows spreading and collecting conveyor means of the apparatus with other parts omitted for clarity.

Referring now to the drawings, the invention is shown applied to a process container of a generally known form, having a floor 1, for receiving the treatment material, with upstanding side walls 2, which extend along the length of the container, and upstanding transverse end walls 3 which span the aforesaid side walls 2. An intermediate step 4 is provided along one wall 3 at what will hereinafter be referred to as the "charging end A" of the container and narrower steps 5, which are approximately the same height as the step 4, are provided along the side walls 2.

Positioned inside the container adjacent to and running almost the full length of, one side wall 2 is a loading conveyor 6 (see FIG. 2) provided with a series of downwardly directed controllable outlets 7a, 7b etc., which extend at intervals along the length of conveyor 6 from an end outlet 7. The outlets 7, 7a, 7b etc., are controlled by closures 6a as indicated in FIG. 2. This loading conveyor 6 is arranged to lie approximately parallel to the floor of the container, well above the intended content level, and at a height just sufficient to clear a carriage 8 which spans the container and is supported by rollers 9 on a pair of tracks 10 respectively located adjacent opposite container side walls 2. These tracks 10 extend over substantially the full length of the container parallel to the loading conveyor 6 and container floor 1 and at a height which is again above the intended content level.

From the carriage 8 is suspended spreading conveyor means in the form of a worm or similar conveyor 11, which spans the full width of the container at right angles to the roller tracks 10. Conveyor 11 is encased by a front wall 12, in leading relationship thereto in the direction of carriage travel during charging, and by a rear wall 13 which trails behind the conveyor in the aforesaid travel direction. The spreading conveyor 11 is operative to spread a load 14 being charged into the container in an even layer over the container floor 1 as will be later explained and, to this end, is positioned at a height in the container which is at or just above the intended content level as indicated at 14a. The spreading conveyor casing defined by the front wall 12 and rear wall 13 is open at the bottom over the full width of the container and a feed hopper 15 opens upwardly from one end of the casing immediately below the loading conveyor 6.

Driving gear 16 mounted on the carriage 8, and receiving power from an external source through a reeling drum or the like (not shown), is arranged to operate a chain drive mechanism which rotates the spreading conveyor 11 at a constant rate determined by the speed at which it is required to layer the container floor. This chain drive mechanism is conveniently provided by a chain 17 which runs around sprockets carried respectively on an output shaft of the driving gear and on a lay shaft 18 mounted in bearings on the carriage, and a further chain 19 which runs around sprockets carried respectively on lay shaft 18 and on shaft 20 of worm conveyor 11. A second chain drive mechanism, actuated by the driving gear 16 through a known form of variable speed device, is arranged to rotate the carriage rollers 9. This second chain drive mechanism incorporates a chain 21 running respectively around a sprocket on an output shaft of the driving gear and a sprocket on spindle 22 which carries the rear carriage wheels 9.

The aforesaid chain drive mechanisms may be replaced by other forms of drive if desired and may be under the control of an operator who normally sits on a seat 23 on the carriage 8. The operator can then drive the carriage at any desired speed along the length of the container floor from the charging end towards the opposite end of the container and back again. The operator's seat 23 is located on the carriage with driving control 24 conveniently to handle and in a position where the operator can constantly observe the end of spreading conveyor 11 which is remote from the feed hopper 15.

The charging of loading conveyor 6 is arranged so that, as the carriage traverses the length of the container floor from the charging end A, the material conveyed by the loading conveyor is always discharged into the spreading conveyor hopper inlet. This can be arranged in a number of alternative ways and, in the embodiment illustrated, the loading conveyor is in the form of a worm conveyor contained in a casing having a series of outlets in the under side controlled by trap doors which can be tripped in turn so as to open into the spreading conveyor hopper 15 as the carriage passes along the length of the loading conveyor.

The front wall 12 of the spreading conveyor casing is provided with a slidable extension 25 which can be lowered at will into contact with the underlying container floor as shown in FIGURE 1. When thus extended, the wall forms a complete division between the spreading conveyor 11 and collecting conveyor means, including a conveyor worm 26, which is also suspended from the carriage 8 and will be later described in more detail. The front wall 12 of the spreading conveyor casing and its extension 25 are arranged to incline rearwardly in the downward direction towards the charging end A of the container.

In the use of the apparatus so far described for the purpose of loading the container, the carriage 8 is first positioned at the charging end A of the container and the extension 25 on the front wall of the spreading conveyor casing is lowered, as shown in full lines in FIGURE 1. The material 14 is then fed by the loading conveyor 6 into the spreading conveyor hopper 15 under gravity and, with the spreading conveyor 11 rotating and the carriage 8 stationary, this material drops straight through the spreading conveyor casing and proceeds to fill the charging space defined between the end wall 3 of the container at the charging end and the division wall, constituted by the front spreading conveyor casing wall 12 and its extension 25. As the material continues to flow into the charging space its level rises until the upper surface comes into contact with the worm of the spreading conveyor 11. Thereafter the material is conveyed by the spreading conveyor worm to fill the aforesaid space across the full width of the container.

When the operator on the carriage observes that the space is completely full he starts the carriage moving away from the charging end of the container and so controls its speed of movement that the spreading conveyor is always conveying material along its full length. The rear casing wall 13 of the spreading conveyor preferably has its lower edge, which defines one side of the bottom casing opening, at the desired content level of the container. As a result, this lower wall edge serves to trim off the surface of the bed of material deposited by the apparatus as the carriage moves away from the end wall at the charging end of the container, with the resulting production of an even layer of material on the container floor in the charging space. The fact that the speed and movement of the apparatus is variable and can be controlled by the operator, ensures that an even layer is deposited regardless to fluctuations in the rate at which material enters the container from the loading conveyor 6.

The container is designed so that, before the carriage reaches the end wall 3 of the container remote from charging end A, the capacity of the charging space will have increased to an extent sufficient to accommodate the largest volume of material which is likely to be produced and sent for treatment at one time. At the end of the charging traverse of the carriage, when the last of the material to be loaded has entered the container, it may be found that a small quantity will remain in the spreader conveyor casing above the normal bed level. This can readily be righted by the operator stopping rotation of the spreader conveyor 11 and then allowing the carriage to traverse a little further along the length of the floor to allow this extra grain to settle down to the required level. The approximate location of the carriage at the end of a charging traverse is indicated, as aforesaid, in chain-dotted lines in FIGURE 1.

With the arrangement described if, as is sometimes the case due to variations in quantity and prior treatment, the volume of material fed to the container is not as great as or is greater than the predetermined or estimated volume, then any such variations in load can readily be accommodated by the fact that the carriage 8 can simply be traversed a shorter or longer distance along the length of the container to vary the capacity of the charging space.

In some cases, however, containers which are normally used, for example for malt, are sometimes also used for barley which is necessarily laid in a shallower layer than malt because the barley has greater resistance to air flow than the malt. In such cases, an extension can be fitted to the rear wall of the spreading conveyor to trim the finished layer of grain at a lower level. The purpose of the apparatus so far described has been to load the container floor with an even layer of material to be treated and, when the loading operation is complete, it will be appreciated that the apparatus carriage will be in a region of the container remote from the charging end A.

In order to unload the container after the treatment period, a discharging conveyor 27 is arranged beneath the container floor 1 at any convenient location across the container width, this discharging or unloading conveyor 27 running parallel to the path of motion of the carriage 1. A continuous opening 28, which is closed off during charging by closures 28a, is provided in the container floor immediately above the discharging conveyor 27 with chutes 29 leading to the aforesaid conveyor so that, when the opening is uncovered as shown in FIGURE 2, the part of the container content immediately thereabove will run on to the discharging conveyor 27 under gravity and be carried away. To enable discharging to be effected over the full width of the container, the aforementioned conveyor worm 26 is provided to span the full width of the container floor. The conveyor worm 26, which is situated on the side of the division wall 12, 25 remote from the spreading conveyor 11, thus lies between the aforesaid wall and the end 3 of the container remote from the charging end A. A chain drive mechanism is arranged to transmit a drive to collecting conveyor 26 from the driving gear 16 and is positioned directly above the floor opening 28. This chain drive mechanism incorporates a chain 30 enclosed by casing 30a and running over sprockets provided respectively on lay shaft 18 and on shaft 31 of conveyor 26. The collecting worm 26 on one side of the drive will have a left-hand spiral and on the other side a right-hand spiral, so that any material coming in contact with the worm is automatically conveyed towards the opening 28. If the opening 28 in the floor were at one extreme side of the floor, then the collecting worm would have a spiral of one hand only.

Also carried by the carriage 8 and forming part of the collecting conveyor means is a back plate 32 for the conveyor worm 26, which plate extends downwardly from the carriage and lies between the aforesaid conveyor 26 at the end of the container remote from the charging end A. This back plate 32 is again arranged to span the full width of the container and is fitted with a brush 33 which follows the collecting conveyor 26 on a discharge traverse of the carriage towards the charging container end A.

In the operation of the apparatus to discharge the container, the extension 25 on the front casing wall of the spreading conveyor 11 is raised, for which purpose the extension is mounted on rollers 34 carried by inclined tracks 35 and connected with operating and counterbalance chains 36 which are run over sprockets and are driven by some convenient form of gear and handwheel not shown. A counterbalance 37 serves to offset the weight of the extension 25 and so reduces the effort required at the handwheel. As illustrated, the chains form loops from which the counterbalance 37 is supported, and the counterbalance thus also moves approximately half the distance travelled by the extension 25. The counterbalance 37 would in this case be approximately twice the weight of the extension 25. As a result of raising the extension 25, the end of the material remote from charging end A of the container, which was previously supported by this extension wall, falls forwardly towards the collecting conveyor 26 which is then exposed to the aforesaid material. The opening in the floor having been uncovered and the first of the material having been run on to the bottom discharging conveyor 27 through the floor opening, the collecting worm 26 is started and, at the same time, the carriage 8 is traversed, at a fixed rate, in the reverse direction towards the charging end A of the container. For this operation a fixed speed of movement can be used as no question of fluctuation in the rate of flow of material arises and, in fact, the carriage can if necessary simply be started by the operator and left to move down the floor on its own. As the carriage so moves, the material remaining on the floor is conveyed by the collecting worm 26 towards the floor opening 28 and so falls on to the dicharging conveyor 27 below the opening and is carried away. Limit switches may be provided on the carriage to stop it when it reaches the charging end A of the container.

The carriage is arranged so that it will stop closer to the charging end A of the container at the end of a discharging traverse than when the carriage is positioned ready for charging. This enables the absolute maximum amount of material to be cleared automatically and, at the end of a discharging traverse, the carriage can be moved back slightly so that any small residue can be swept into the conveyor below the floor by hand. For reloading, the division wall 25 will again be lowered and the procedure repeated.

As an alternative to hand control of the speed of the machine during the charging operation, which hand control entails the presence of the operator within the container, a form of automatic control for speed can be substituted. This automatic control can be achieved by arranging a device at the end of the spreading conveyor opposite to its feed hopper, which is disturbed by the material being handled when it reaches the end of the conveyor. This disturbance can then be used as a signal to vary the speed of the traversing drive of the machine. For example, a paddle could be arranged which would be moved by the grain and the movement of this paddle would serve as a signal. Alternatively, an electrode, of the type which can detect the presence of material without actually touching it, such as is used for automatic level control appliances, could be used. This form of automatic control is an advantage where working conditions in the container are detrimental to a human operator.

I claim:

1. A process container of the kind referred to having a mechanical charging apparatus including a division wall which spans the width of the container down to floor level, means for moving said division wall along the container length from one end during charging to provide a charging space behind the wall in the container having a capacity which is progressively increased to an extent dependent upon the quantity of material fed to the container, means for feeding material to the charging space behind the wall, and further including spreading conveyor means arranged to move along the length of the container behind said wall for the purpose of evenly layering material fed to the charging space.

2. A process container of the kind referred to having combined mechanical charging and discharging apparatus including a movable carriage which is mounted to travel along the length of the interior of the container, above the intended content level, in one direction for charging and in the opposite direction for discharging purposes, upper transverse spreading conveyor means supported by the carriage extending across the width of the container near the intended content level, similarly extending lower transverse collecting conveyor means supported by the carriage near floor level, and transverse retractable wall means arranged to divide off the collecting conveyor from a variable charge receiving space in the container over which the spreading conveyor means operates during charging.

3. A process container as claimed in claim 2 further including a loading conveyor which extends lengthwise of the container above the carriage and adjacent to one container side wall, a controlled opening in the container floor extending lengthwise thereof, and a discharging conveyor which runs parallel to the loading conveyor beneath the controlled opening extending lengthwise along the container body.

4. A process container as claimed in claim 3 wherein the transverse retractable wall means constitutes the front wall of a spreading conveyor casing which is defined by front and rear walls and is open at the bottom over the full width of the container, and wherein a feed hopper opens upwardly from one end of the casing immediately below the loading conveyor which latter has downwardly directed controllable outlets along the length thereof which register in turn with the feed hopper during a charging traverse of the apparatus.

5. A process container as claimed in claim 2, wherein the retractable wall means includes a slidable extension which can be lowered at will into contact with the underlying container floor to provide a complete division between the spreading and collecting conveyors, the said retractable wall means being arranged to incline rearwardly in the downward direction towards the charging end of the container at which the apparatus is located at the commencement of a charging traverse.

6. A process container as claimed in claim 4 wherein the rear casing wall of the spreading conveyor is arranged to trim off the surface of a bed of material deposited by the apparatus during a charging traverse.

7. A process container as claimed in claim 2, including a power drive for the carriage and conveyors comprising driving gear mounted on the carriage.

8. A process container as claimed in claim 3, wherein the carriage extends across the full width of the container and includes an operator's seat mounted in a position such that the operator can observe the end of the spreading conveyor remote from the loading conveyor.

9. A process container as claimed in claim 4 wherein the outlets in the loading conveyor are controlled by a series of trap doors which can be tripped in turn to open into the feed hopper for the spreading conveyor.

10. A process container as claimed in claim 2, wherein the collecting conveyor means includes a conveyor which spans the full width of the container floor and is situated in front of the retractable wall means, and a back plate which extends downwardly from the carriage and lies between the collecting conveyor and the end of the container remote from the end at which charging commences.

11. A process container as claimed in claim 10 wherein the back plate is arranged to span the full width of the container and a brush fitted thereto which engages the floor of the container and follows the collecting conveyor on a discharge traverse of the carriage.

12. A process container as claimed in claim 3, wherein the collecting conveyor is arranged to transfer material on the container floor laterally towards the floor opening.

References Cited in the file of this patent
UNITED STATES PATENTS

| | | |
|---|---|---|
| 984,249 | Weschler | Feb. 14, 1911 |
| 2,406,886 | McBean | Sept. 3, 1946 |
| 2,895,720 | Koch et al. | July 21, 1959 |